US012181069B2

(12) United States Patent
Kao et al.

(10) Patent No.: US 12,181,069 B2
(45) Date of Patent: Dec. 31, 2024

(54) ARBITRARY DIRECTIONAL TOUCH SWITCH

(71) Applicant: Neoperl AG, Reinach (CH)

(72) Inventors: Chih-Hung Kao, New Taipei Taiwan (CN); Chin-Yuan Hsiao, New Taipei Taiwan (CN)

(73) Assignee: Neoperl AG, Reinach (CH)

(*) Notice: Subject to any disclaimer, the term of this patent is extended or adjusted under 35 U.S.C. 154(b) by 517 days.

(21) Appl. No.: 17/430,460

(22) PCT Filed: Jan. 9, 2020

(86) PCT No.: PCT/CN2020/071157
§ 371 (c)(1),
(2) Date: Aug. 12, 2021

(87) PCT Pub. No.: WO2020/164342
PCT Pub. Date: Aug. 20, 2020

(65) Prior Publication Data
US 2022/0213977 A1 Jul. 7, 2022

(30) Foreign Application Priority Data
Feb. 15, 2019 (CN) ......................... 201910118818.6

(51) Int. Cl.
*E03C 1/04* (2006.01)
*F16K 31/524* (2006.01)
*F16K 31/58* (2006.01)

(52) U.S. Cl.
CPC ...... *F16K 31/52408* (2013.01); *E03C 1/0404* (2013.01); *F16K 31/58* (2013.01)

(58) Field of Classification Search
CPC .......... F16K 31/56; F16K 31/58; E03C 1/084; E03C 1/0404
See application file for complete search history.

(56) References Cited

U.S. PATENT DOCUMENTS 11,326,714 B2 * 5/2022 Kao ........................ F16K 31/56
2009/0045370 A1 * 2/2009 Kao ........................ F16K 31/58 251/324

(Continued)

FOREIGN PATENT DOCUMENTS

CN 2890518 4/2007
CN 201396482 2/2010

(Continued)

*Primary Examiner* — Joseph A Greenlund
(74) *Attorney, Agent, or Firm* — Volpe Koenig

(57) ABSTRACT

An arbitrary directional touch switch, having a valve body and a push member. The valve body includes a housing, a main flow passage and a switching mechanism. The housing has at least one support portion formed at a water outlet end that protrudes outwardly. The switching mechanism selectively blocks the main flow passage. The push member is connected to the valve body, and has a water passage portion, at least one suspension portion and a push-abutment portion. The suspension portion is movably connected to the support portion, and the push-abutment portion can drive the switching mechanism to block the main flow passage. As a motion space is formed on the inner side of the suspension portion, the switching mechanism can be driven to operate by pushing the push member in an axial, transverse and/or oblique direction, to switch the arbitrary directional touch switch between closed and open states.

8 Claims, 10 Drawing Sheets

(56) References Cited

U.S. PATENT DOCUMENTS

| | | | | |
|---|---|---|---|---|
| 2012/0018661 | A1* | 1/2012 | Kao | E03C 1/08 251/359 |
| 2014/0217314 | A1* | 8/2014 | Kao | F16K 21/06 251/12 |
| 2020/0263806 | A1* | 8/2020 | Kao | E03C 1/08 |
| 2022/0213977 | A1* | 7/2022 | Kao | B05B 1/3013 |
| 2023/0039121 | A1* | 2/2023 | Kao | B05B 1/18 |

FOREIGN PATENT DOCUMENTS

| | | | | |
|---|---|---|---|---|
| CN | 201475344 | | 5/2010 | |
| CN | 202010589 | | 10/2011 | |
| CN | 205479654 | | 8/2016 | |
| CN | 107289184 | | 10/2017 | |
| TW | 201736766 | A * | 10/2017 | F16K 31/56 |
| TW | I647397 | | 1/2019 | |

* cited by examiner

ARBITRARY DIRECTIONAL TOUCH SWITCH

FIELD OF THE INVENTION

The present invention relates to a water supply device, and more particularly to a water supply device mounted at a pipework outlet.

BACKGROUND

Conventional handwash sink faucets or bathroom sink faucets have separately arranged water outlets and controls, such that the water outlets are positioned above the sink, and the controls are positioned near an edge of the sink. After a user has finished handwashing, the user needs to move his/her hands to the edge of the sink in order to operate the control to turn the faucet off. This would result in the countertop near the sink being wetted by water dripping from the user's hands.

A conventional valve mounted at a water outlet of a faucet has been available on the market, which allows on/off switch operation at the outlet of the faucet and avoids the need for users to move their wet hands to the control to turn off the faucet. The countertop can therefore be kept from getting wet. However, the conventional valve mounted at the water outlet of the faucet can only operate the faucet by upward or sideward pressing of a switch of the valve. This limits application of the valve.

In view of this, the present invention provides an improved solution to the aforementioned problems.

SUMMARY

The main object of the invention is to provide a multi-directional touch valve, which may turn on/off water supply by pressing from multiple directions, such as upwards, sidewards or at oblique angles.

In order to achieve the above-mentioned object, the present invention provides a multi-directional touch valve which comprises:

a valve body, including:

a housing having a water outlet end and a pipe connecting end opposite to each other, wherein an axial direction is defined as a direction along a line connecting the water outlet end and the pipe connecting end, and a transverse direction is defined as a direction perpendicular to the axial direction, the housing being provided with:

at least one support portion formed at the water outlet end of the housing and protruding transversely outwardly, a primary flow channel formed in the housing and extending from to the water outlet end to the pipe connecting end, and a switching mechanism mounted in the housing and configured to selectively block the primary flow channel; and a pressing member movably connected with the valve body, including:

a push-abutment portion configured to selectively drive the switching mechanism to block the primary flow channel, a water passage portion surrounding the push-abutment portion and allowing water to flow therethrough, and at least one suspension portion fixed around an outer circumference of the water passage portion and movably hang on the at least one support portion, wherein a motion space is formed on an inner side of each of the at least one suspension portion and on a side of the suspension portion facing the pipe connecting end of the housing, such that the pressing member is operable to move away from the center of the valve body and to move towards the pipe connecting end, and wherein when the pressing member moves relative to the valve body, the push-abutment portion drives the switching mechanism to block or unblock the primary flow channel.

The present invention is advantageous in that a user can push the pressing member in axial, transverse, or oblique directions to actuate the switching mechanism, thereby switching the valve between an open state and a closed state by pushing the pressing member in any direction. This makes the touch valve very convenient to use.

In the multi-directional touch valve, the support portion comprises:

a first transverse extension member protruding transversely outwardly from the water outlet end, and a first axial extension member protruding from an outer edge of the first transverse extension member towards the pipe connecting end of the housing; and each of the at least one suspension portion comprises:

a second axial extension member protruding from an outer edge of the water passage portion towards the pipe connecting end of the housing, a second transverse extension member protruding transversely inwardly from an end portion of the second axial extension member adjacent to the pipe connecting end of the housing, and a positioning groove formed on the second transverse extension member and including two opposite inclined surfaces facing each other, the first axial extension member movably positioned in the positioning groove.

In the multi-directional touch valve, the positioning groove of each of the at least one suspension portion has two opposite inclined surfaces facing each other.

In the multi-directional touch valve, the first axial extension member of each of the at least one support portion has two opposite inclined surfaces facing away from each other and selectively abutting the inclined surfaces of the positioning groove.

In the multi-directional touch valve, the second transverse extension member of each of the at least one suspension portion has a bevel formed on an inner edge of the second transverse extension member and inclined with respect to the axial direction.

In the multi-directional touch valve, the housing has at least one groove formed thereon, and each of the at least one support portion forms a surface of the at least one groove respectively; the motion space of each of the at least one suspension portion is located in the at least one groove; and the at least one groove has a support surface, the support surface being parallel to the bevel of corresponding the suspension portion.

In the multi-directional touch valve:

the number of the at least one support portion is one, and the support portion is annular and protrudes radially; and the number of the at least one suspension portion is one, and the suspension portion is annular and extends radially inwardly, and selectively abuts a side surface of the support portion facing the pipe connecting end of the housing.

In the multi-directional touch valve:

the number of the at least one support portion is one, and the first transverse extension member and the first axial extension member of the support portion are annular; and the number of the at least one suspension portion is one, and the second axial extension member, the second transverse extension member, and the positioning groove of the suspension portion are annular.

In the multi-directional touch valve:

the number of the at least one support portion is greater than one; and the number of the at least one suspension portion is greater than one and equals the number of the at least one support portion, wherein:

the first axial extension member of each support portion corresponds to the positioning groove of one of the suspension portions, and a transverse width of the positioning groove is greater than a transverse width of the first axial extension member.

DETAILED DESCRIPTION

Figure 1:
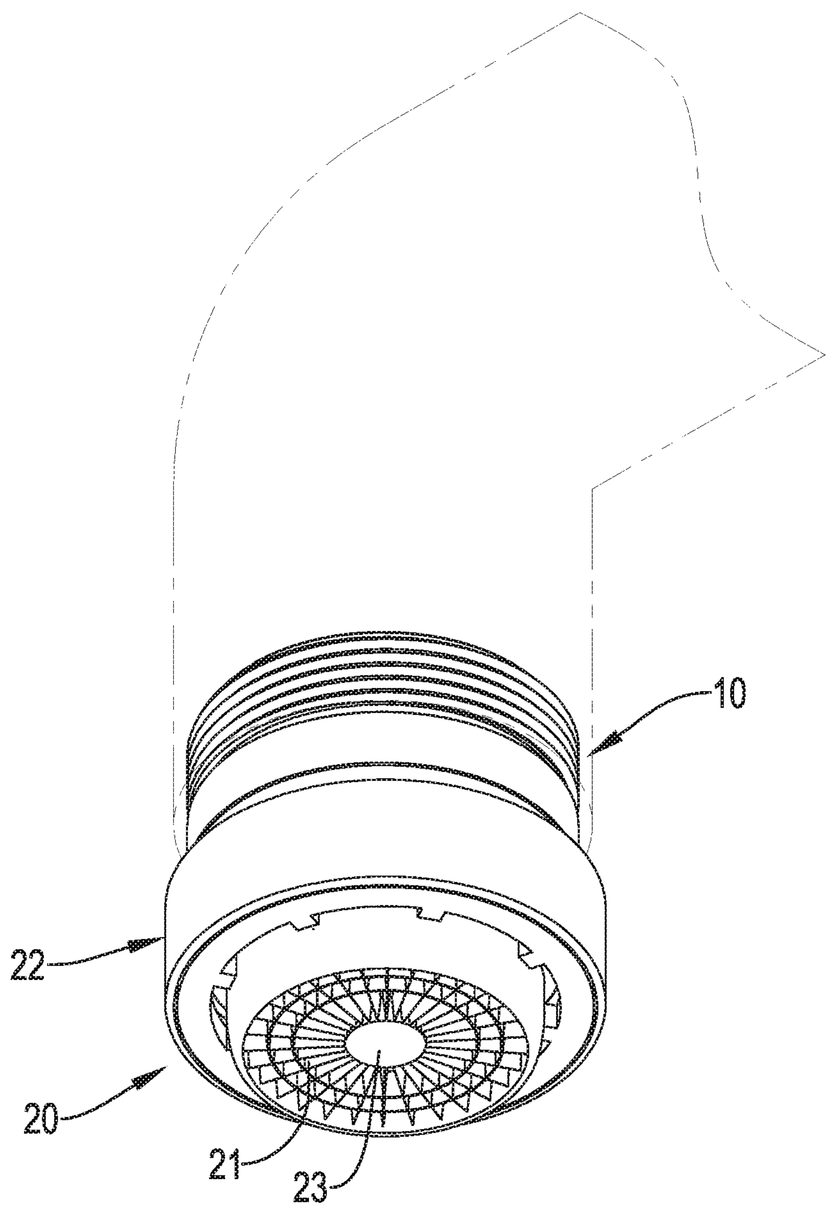
FIG. 1 is a perspective view of a multi-directional touch valve in accordance with the present invention mounted in a water faucet.
Figure 2:
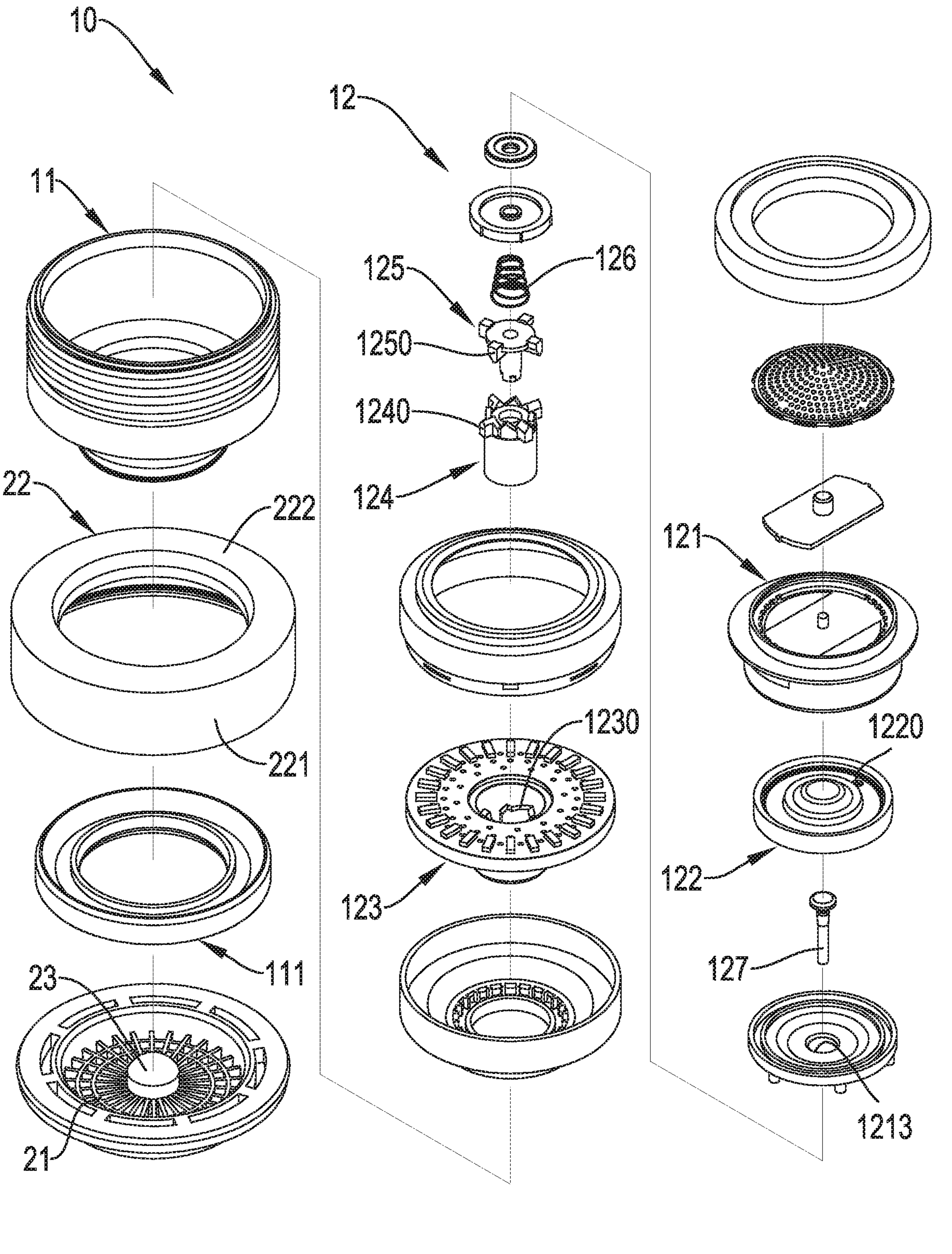
FIG. 2 is an exploded perspective view of the multi-directional touch valve of the present invention.
Figure 3:
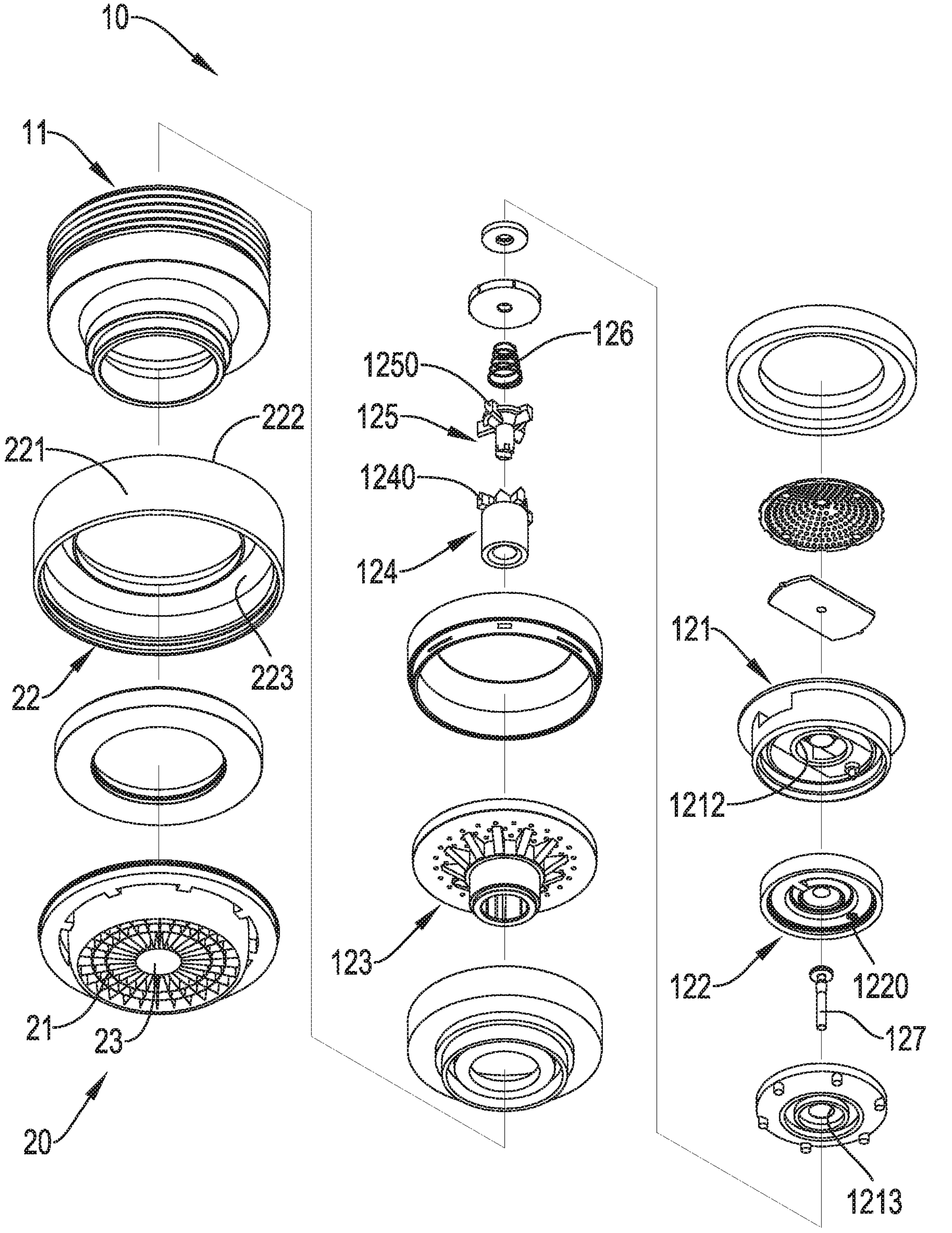
FIG. 3 is another exploded perspective view of the multi-directional touch valve of the present invention.

As shown in FIGS. 1 to 3, the present invention provides a multi-directional touch valve which has a valve body 10 and a pressing member 20.

The valve body 10 has a housing 11, a switching mechanism 12, and a primary flow channel. Two ends of the housing 11 are a water outlet end and a pipe connecting end respectively. The water outlet end is operable to output water, and the pipe connecting end is to be connected with a spout of a faucet or an outlet of a water pipe. An axial direction is defined as a direction along a line connecting the water outlet end and the pipe connecting end. A transverse direction is defined as a direction perpendicular to the axial direction. In the description below, an upward direction is defined as an axial direction from the water outlet end towards the pipe connecting end, and a downward direction is defined as an axial direction from the pipe connecting end towards the water outlet end, but the invention is not limited in this respect.

The switching mechanism 12 is mounted in the housing 11. The primary flow channel is formed in the housing 11 and extends from the pipe connecting end through the switching mechanism 12 to the water outlet end. The primary flow channel is connected to external units at the water outlet end and the pipe connecting end.

Figure 4:
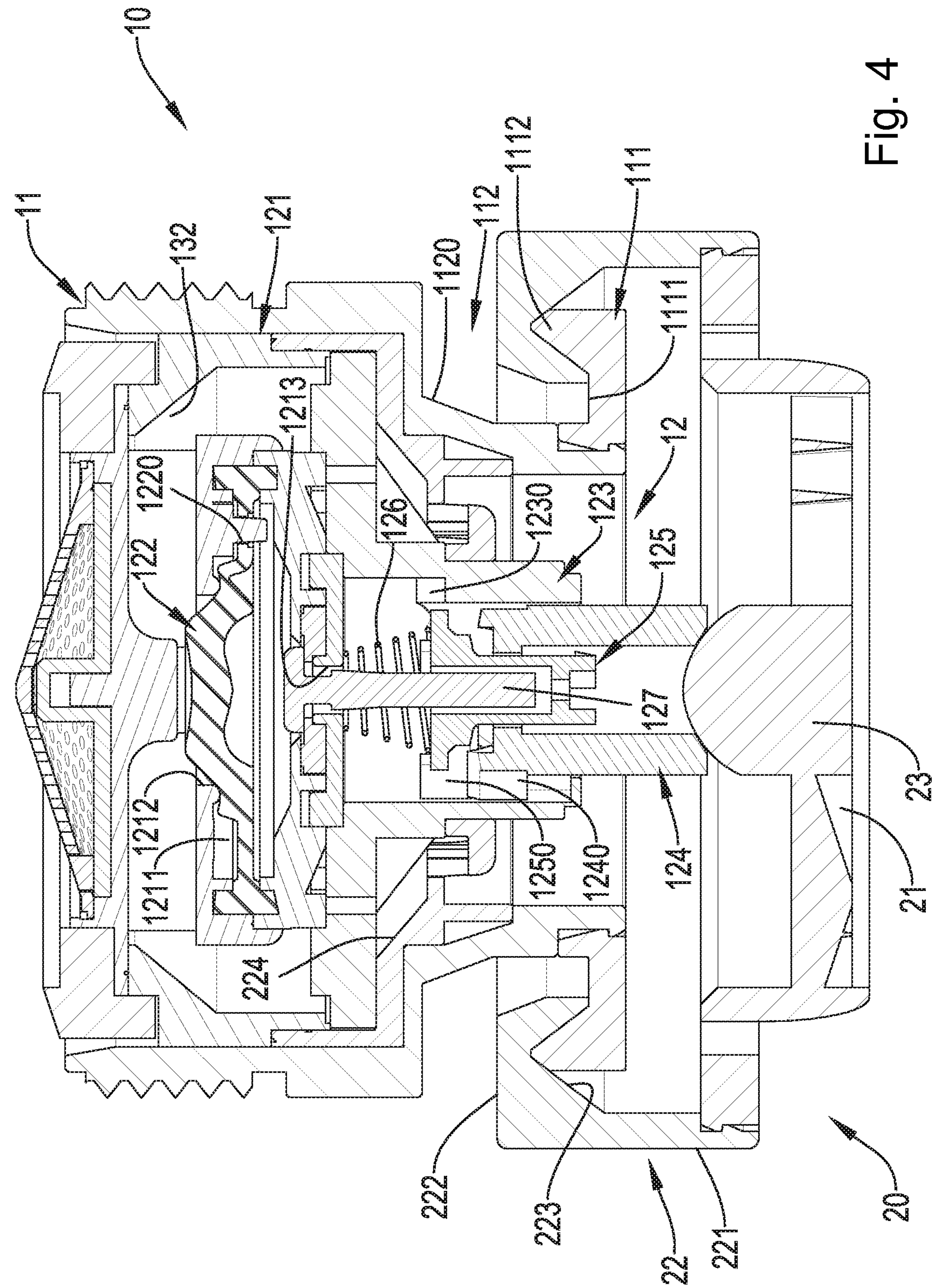
FIG. 4 is a cross-sectional view of the multi-directional touch valve of the present invention at a closed state.
Figure 5:
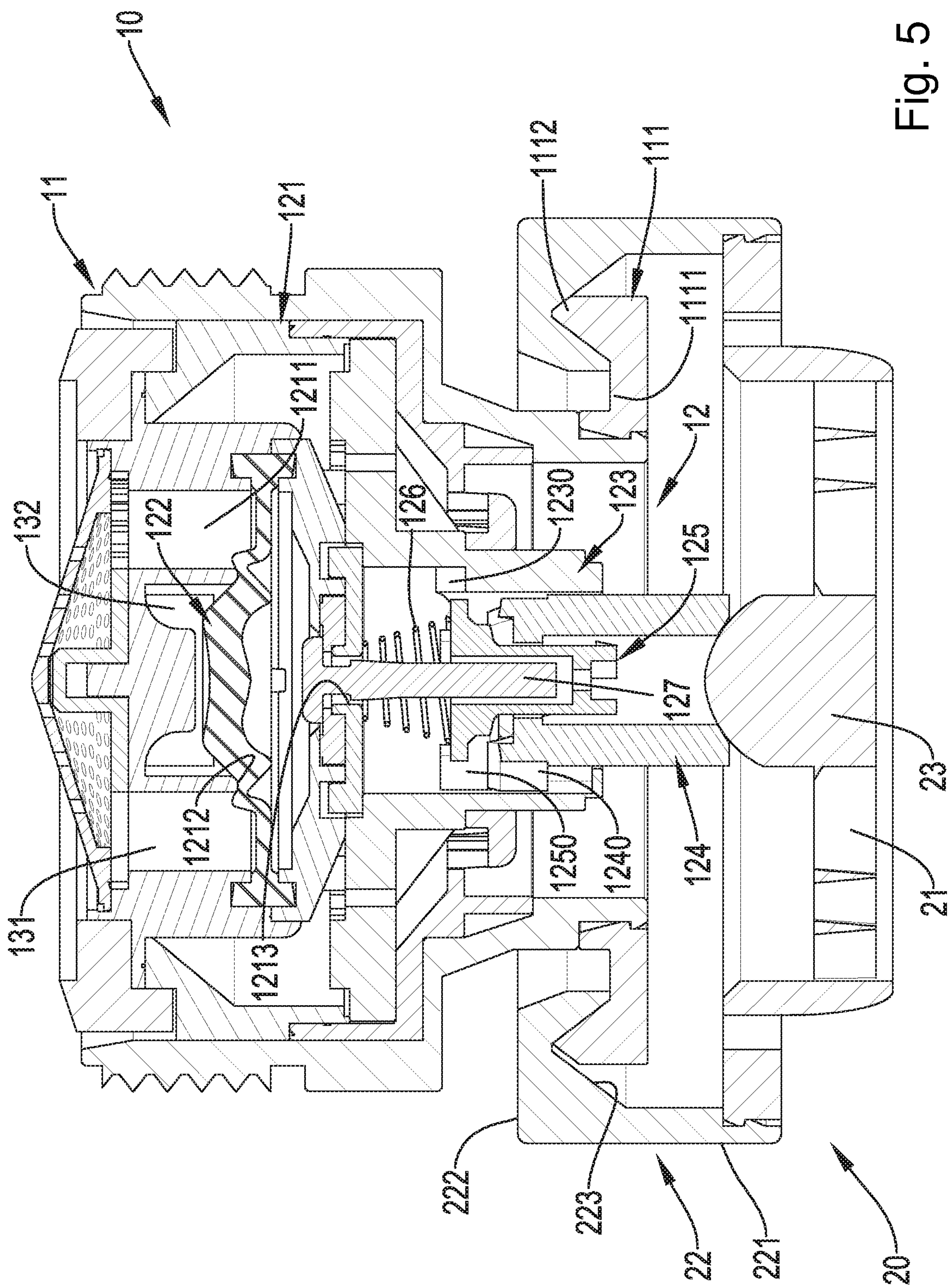
FIG. 5 is another cross-sectional view of the multi-directional touch valve of the present invention at the closed state.

As shown in FIGS. 4 and 5, the housing 11 has at least one support portion 111 formed on an outer circumference of the water outlet end of the housing 11 and protruding outwardly therefrom. The at least one support portion 111 may have a first transverse extension member 1111 and a first axial extension member 1112. The first transverse extension member 1111 protrudes outwardly from the water outlet end of the housing 11. The first axial extension member 1112 protrudes from an outer edge of the first transverse extension member 1111 towards the pipe connecting end of the housing 11. A cross section of the at least one support portion 111 has a transversely arranged L-shape, but the invention is not limited thereto. In the embodiment, one support portion 111 is included, and the support portion 111 is annular and extends radially outwardly. The first transverse extension member 1111 and the first axial extension member 1112 of the support portion 111 are annular.

In the embodiment, the first transverse extension member 1111 of each support portion 111 has two opposite inclined surfaces facing away from each other. One of the inclined surfaces is located near the exterior, and the other inclined surface is located near the interior. The inclined surface located near the exterior faces outwardly and is inclined upwards, and the inclined surface located near the interior faces inwardly and is inclined upwards. Consequently, the cross section of the first transverse extension member 1111 is tapered in shape.

In the embodiment, the housing 11 has at least one groove 112, and a wall of the at least one groove 112 forms the support portion 111. The number of the at least one groove 112 equals the number of the at least one support portion 111. The groove 112 has a support surface 1120 which is inclined relative to the axial direction. A cross section of the groove 112 may have a transversely arranged L-shape, and the support surface 1120 is provided at the turning portion of the L-shape. In another embodiment, the housing 11 may have no groove 112, and the support portion 111 may protrude from an outer surface of the housing 11.

The pressing member 20 is movably connected with the valve body 10 and has a water passage portion 21, at least one suspension portion 22, and a push-abutment portion 23. The water passage portion 21 is configured to allow water to flow therethrough. In other words, water flowing from the primary flow channel 13 flows out of the multi-directional touch valve via the water passage portion 21. In the embodiment, the water passage portion 21 may be arranged in mesh patterns, radial patterns, grid patterns, and so on to allow water to flow through.

The at least one suspension portion 22 is fixed at an outer side of the water passage portion 21 and is movably held on the support portion 111. The suspension portion 22 has a second axial extension member 221, a second transverse extension member 222, and a positioning groove 223. The second axial extension member 221 is fixed at the outer side of the water passage portion 21 and protrudes from the outer side of the water passage portion 21 towards the pipe connecting end of the housing. The second transverse extension member 222 extends transversely inwardly from an end of the second axial extension member 221 adjacent to the pipe connecting portion of the housing 11. In other words, a cross section of the suspension portion 22 also has a transversely arranged L-shape in a reversed direction to the support portion 111. The second transverse extension member 222 has a bevel 224 formed on an inner edge of the second transverse extension member 222 facing the housing 11. The bevel 224 is inclined upwards relative to the axial direction and is parallel to the support surface 1120 of the groove 112 of the housing 11.

The positioning groove 223 is formed on a side of the second transverse extension member 222 facing the water outlet end. In the embodiment, the positioning groove 223 has two opposite inclined downward facing surfaces, but the invention is not limited thereto. The positioning groove 223 may also be a concave surface recessed upwardly. One of the inclined surface is located near the exterior, and the other inclined surface is located near the interior. The inclined surface near the exterior faces inwardly and is inclined downwards, and the inclined surface near the interior faces outwardly and is inclined downwards. The first axial extension member 1112 of the support portion 111 is movably mounted in the positioning groove 223. The suspension portion 22 selectively abuts a side of the support portion 111 facing the pipe connecting end of the housing 11. When no external force is applied to the pressing member 20, the first axial extension member1112 moves under gravity along the two inclined surfaces to the deepest position of the positioning groove 223, i.e., where the two inclined surfaces meet each other. At this time, a central axis of the pressing member 20 is aligned with a central axis of the housing 11.

The number of the at least one suspension portion 22 equals the number of the at least one support portion 111. In the embodiment, the number of the at least one suspension portion 22 is one. The suspension portion 22 is annular and extends radially inwardly. The second axial extension member 221, the second transverse extension member 222, and the positioning groove 223 are annular.

With respect to the housing 11, a motion space is formed on an inner side of the suspension portion 22 and on a side of the suspension portion 22 facing the pipe connecting end of the housing 11. The motion space is located in the groove 112 of the housing 11. In other words, the space within the groove 112 is the motion space. The motion space allows the pressing member 20 to move relative to the valve body 10 along a direction away from the center or the axis of the valve body 10 and to move towards the pipe connecting end of the housing. In other words, the inner side of the suspension portion 22 and the housing 11 do not contact each other, and the side of the suspension portion 22 facing the pipe connecting portion of the housing 11 and the housing 11 do not contact each other either. Instead, a space is formed therebetween. Thus, movement of the suspension portion 22 will not be obstructed, thereby allowing the pressing member 20 to move along axial, transverse or oblique directions.

The push-abutment portion 23 is fixed on the center of the water passage portion 21. In other words, the water passage portion surrounds the push-abutment portion. The push-abutment portion 23 selectively drives the switching mechanism 12 to block or unblock the primary flow channel. The push-abutment portion 23 of the pressing member 20 has a protrusion surface facing the pipe connecting end of the housing 11. The push-abutment portion 23 protrudes towards the pipe connecting end of the housing 11. In alternative embodiments, the push-abutment portion 23 may alternatively have a recessed surface. When the pressing member 20 moves relative to the valve body 10, the push-abutment portion 23 drives the switching mechanism 12 to block or unblock the primary flow channel.

In alternative embodiments, a plurality of support portions and a plurality of suspension portions may be provided, with each suspension portion arranged on a support portion. Each support portion and the corresponding suspension portion may be matching plate members. Specifically, the first axial extension member of each support portion is located within a positioning groove of a corresponding suspension portion. A transverse width of the positioning groove is greater than a transverse width of the first axial extension member, thereby allowing the pressing member to move transversely or obliquely without obstruction.

In another embodiment, the support portion may have a first transverse extension member without a first axial extension member. The suspension portion may have a second transverse extension member without a second axial extension member. In other words, the support portion and the suspension portion may only extend transversely.

The switching mechanism 12 is mounted in the housing 11 and selectively blocks the primary flow channel. In the embodiment, the switching mechanism 12 has a flow seat 121, a gasket 122, a control seat 123, a shifting element 124, a rotation member125, an elastic element126, and a blocking element 127, but the invention is not limited as such.

The flow seat 121 is fixed in the housing 11, and the primary flow channel 13 is formed through the flow seat 121. The flow seat 121 has a chamber 1211, an opening 1212, and a first through hole 1213. The chamber 1211 is formed in the flow seat 121. The primary flow channel 13 extends through the chamber 1211. In other words, the chamber 1211 is a segment of the primary flow channel 13. The opening 1212 extends through a side wall of the flow seat facing the pipe connecting end of the housing 11. The first through hole 1213 extends through a side wall of the flow seat facing the water outlet end of the housing 11. The opening 1212 and the first through hole 1213 are respectively formed in opposite sides of the flow seat 121. The opening 1212 and the first through hole 1213 are connected within the chamber 1211. The primary flow channel goes through the opening 1212, and is divided to an input path 131 and an output path 132 at the opening 1212.

The gasket 122 is movably mounted in the chamber 1211 to divide the chamber 1211 into a primary compartment and an auxiliary compartment. The primary compartment is located near the water outlet end and the auxiliary compartment is located near the pipe connecting end. The primary flow channel extends through the auxiliary compartment. More specifically, the input path 131 of the primary flow channel extends through the auxiliary compartment. The gasket 122 selectively seals the opening 1212 to block the input path 131 and the output path 132. The gasket 122 may bend upwards or move upwards to seal the opening 1212. The gasket 122 has a second through hole 1220 formed therethrough and connected with the first through hole 1213. The second through hole 1220 of the gasket 122, the auxiliary compartment of the chamber 1211, and the first through hole 1213 of the flow seat 121 form an auxiliary flow channel.

The control seat 123 is mounted in the housing 11 and is disposed closer to the water outlet end than the flow seat 121. The control seat 123 has a through cavity and multiple serrated portions 1230. The serrated portions 1230 are formed on a side wall of the through cavity and spaced part from each other to form a recess portion between each two adjacent serrated portions 1230. Each recess portion extends axially. A shifting element 124 is mounted in the through cavity of the control seat 123 and has multiple guiding protrusions 1240 transversely protruding therefrom. Each guiding protrusion 1240 is mounted in a respective one of the recess portions. The width of each guiding protrusion 1240 is equal to the width of the respective recess portion. The sliding direction of the shifting element 124 is limited in the axial direction by the guiding protrusion 1240. The bottom of the shifting element 124 abuts the pressing member 20. The push-abutment portion 23 corresponding to the pressing member 20 is formed at the bottom of the shifting element 124. The shifting element 124 has a recess at its lower end to receive the top of the push-abutment portion 23.

The rotation member 125 is mounted in the control seat 123 and is disposed closer to the pipe connecting end of the housing 11 than the shifting element 124. The rotation member 125 is rotatably and axially movably mounted in the control seat 123 and selectively abuts the shifting element 124. The rotation member 125 has multiple guided protrusions 1250 transversely protruding therefrom. The guided protrusions 1250 are selectively mounted in the recess portions, stacked on the guiding protrusions 1240 or selectively stacked on the serrated portions 1230 of the control seat 123. That is, the rotation member 125 can be mounted in the recess portions and stacked on the shifting element 124 and stacked on the serrated portions 1230 upon rotation or movement. An end of the elastic element 126 abuts the flow seat 121, and the other end of the elastic element 126 abuts the rotation member 125 to press the rotation member 125 towards the water outlet end of the housing 11. The blocking element 127 is axially movably mounted in the control seat 123 and is connected with the rotation member 125. The blocking element 127 is driven by the rotation member 125 to selectively block the first through hole 1213.

With such arrangements, the multi-directional touch valve has a closed state, a transitional state, and an open state.

As shown in FIGS. 4 and 5, in the closed state, the suspension portion 22 of the pressing member 20 abuts the support portion 111 of the valve body 10. A surface of the positioning groove 223 abuts the support portion 111. In the embodiment, the surface of the positioning groove 223 abuts the first axial extension member 1112 of the support portion 111. In other words, the first axial extension member 1112 of the support portion 111 is mounted in the positioning groove 223. At the same time, the rotation member 125 is stacked on the shifting element 124, and the guided protrusions 1250 of the rotation member 125 are mounted in the recess portions and stacked on the guiding protrusions 1240 of the shifting element 124. Thus, the rotation member 125 is disposed at a position away from the pipe connecting end of the housing 11, and the blocking element 127 is in a position away from the pipe connecting end of the housing 11 to seal the first through hole 1213 of the flow seat 121. When water flows into the primary flow channel, water first flows through the input path 131 to the primary compartment of the chamber 1211, and because the second through hole 1220 of the gasket 122 is not sealed, water can flow through the second through hole 1220 to the auxiliary compartment, but cannot flow through the first through hole 1213. In other words, water inside the auxiliary compartment cannot flow out. Consequently, water pressure builds up to push the gasket 122 upwards, such that the gasket 122 abuts and seals the opening 1212 and blocks the primary flow channel.

Figure 6:
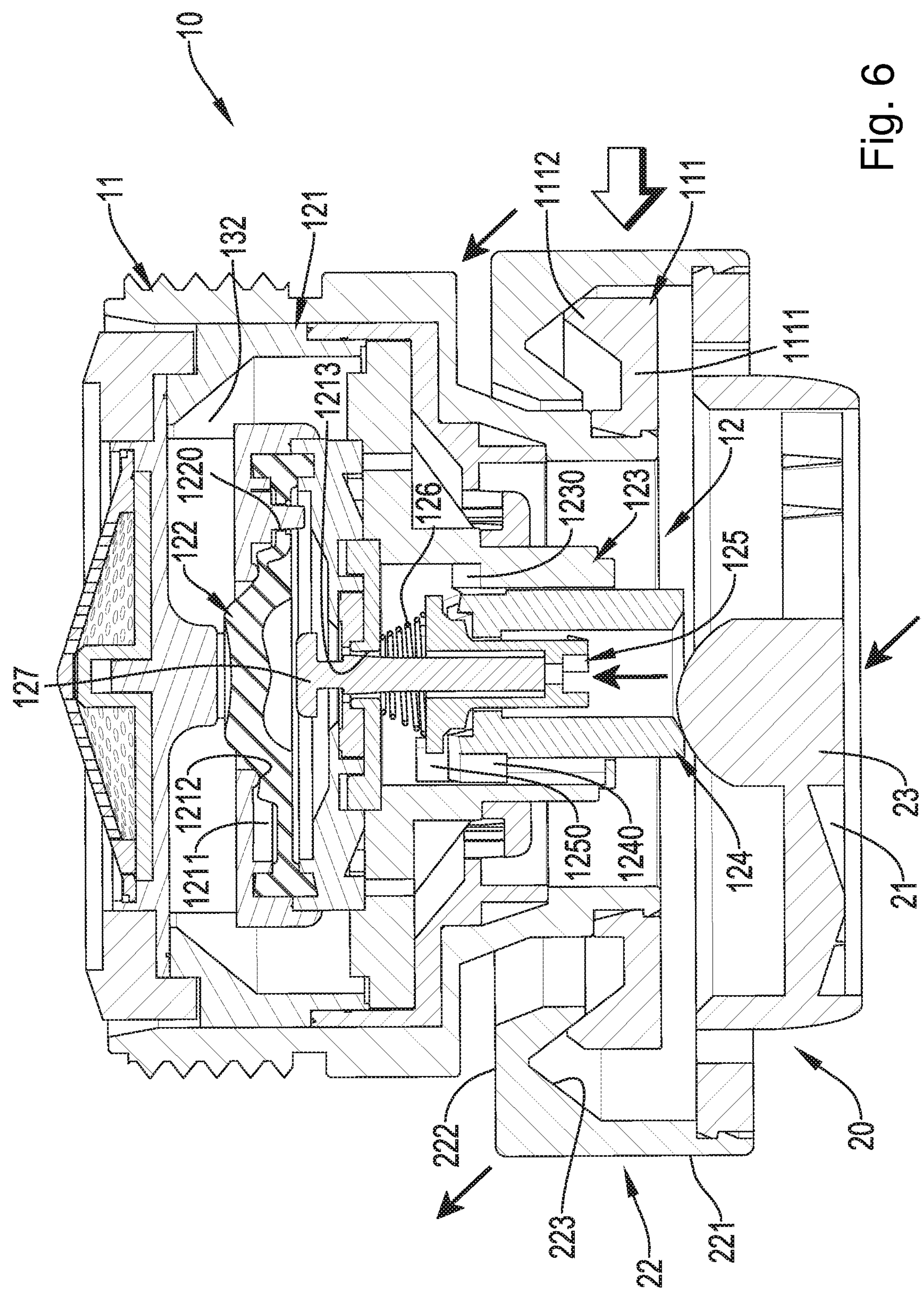
FIG. 6 is an operational cross-sectional view of the multi-directional touch valve of the present invention, showing a transitional state of the multi-directional touch valve subjected to a transverse pressing force.
Figure 7:
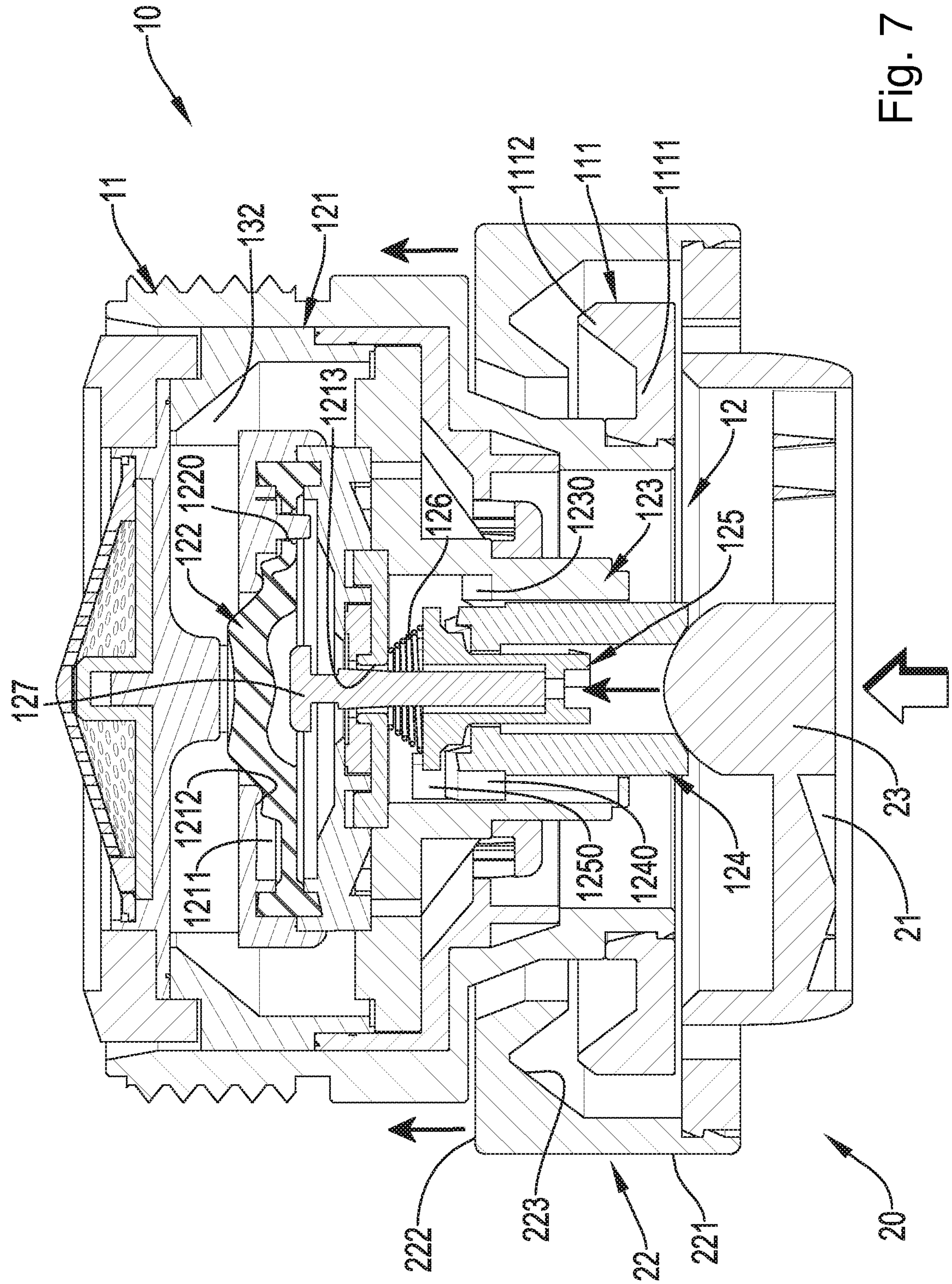
FIG. 7 is an operational cross-sectional side view of the multi-directional touch valve of the present invention, showing a transitional state of the multi-directional touch valve subjected to an axial pressing force.
Figure 8:
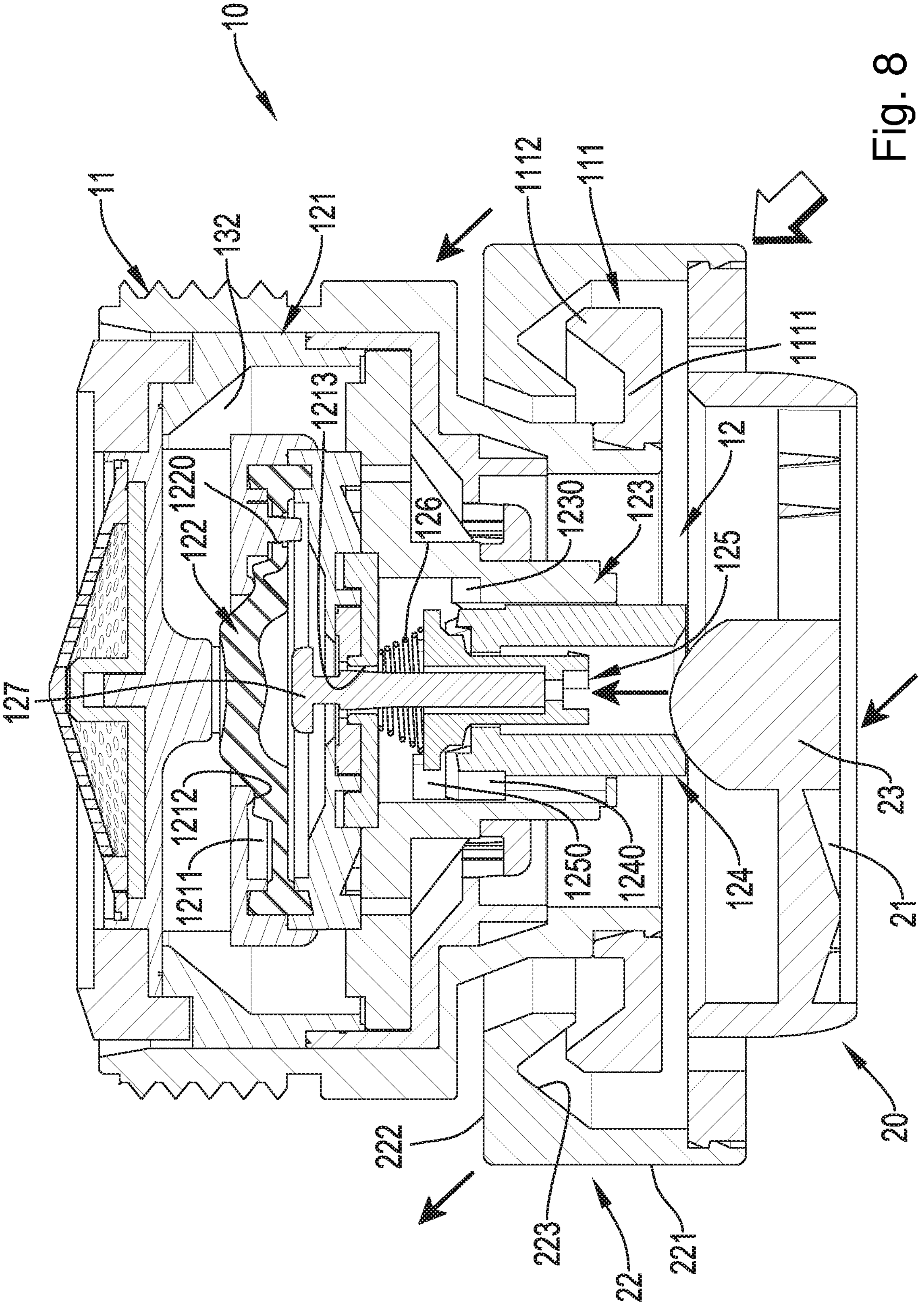
FIG. 8 is an operational cross-sectional side view of the multi-directional touch valve of the present invention, showing a transitional state of the multi-directional touch valve subjected to an oblique pressing force.

As shown in FIGS. 6, 7, and 8, the pressing member 20 can be pressed axially, transversely, or obliquely. Due to the motion space formed on the side of the suspension portion of the pressing member 20 facing the pipe connecting end of the housing, or the motion space between the suspension portion and the housing 11, the pressing member 20 can move axially upwards. Because the inner side of the suspension portion 22 has a motion space or is spaced from the housing 11, the pressing member 20 can move transversely in any radial direction. In the invention, as a motion space is provided above and inside the suspension portion 22, the suspension portion 22 can also move obliquely, i.e., the pressing member 20 can move obliquely.

The transitional state is defined as the movement process of the pressing member 20. In the transitional state, the push-abutment portion 23 of the pressing member 20 is shifted away from a preset position, and the push-abutment portion 23 moves away from the shifting element 124 to allow the shifting element 124 to be pushed up. When the shifting element 124 is pushed up, the guiding protrusions 1240 of the shifting element 124 slide upwards along the extension direction of the recess portions formed between the serrated portions 1230 of the control seat 123, to push the rotation member 125 upwards and cause the guided protrusions 1250 to move out from the recess portions. Because contact surfaces between the guiding protrusions 1240 and the guided protrusions 1250 are inclined surfaces, the rotation member 125 can rotate after the guided protrusions 1250 move out of the recess portions and cause the guided protrusions 1250 to be stacked on the serrated portion 1230. When a user stops pushing the pressing member 20, the elastic element 126 causes the shifting element 124 to return to the preset position and to drive the push-abutment portion 23 to return to the preset position.

For example, as shown in FIG. 6, when a user pushes the pressing member 20 in a transverse direction, the inclined surfaces of the first transverse extension member 1111 of the support portion 111 or the inclined surfaces of the positioning groove 223 of the suspension portion 22 cause the suspension portion 22 to slide along the inclined surfaces. In other words, movement of the pressing member 20 includes an element of axial movement even when it is transversely pressed, thus ensuring that the shifting element 124 can be pushed upwards by the push-abutment portion 23.

Figure 9:
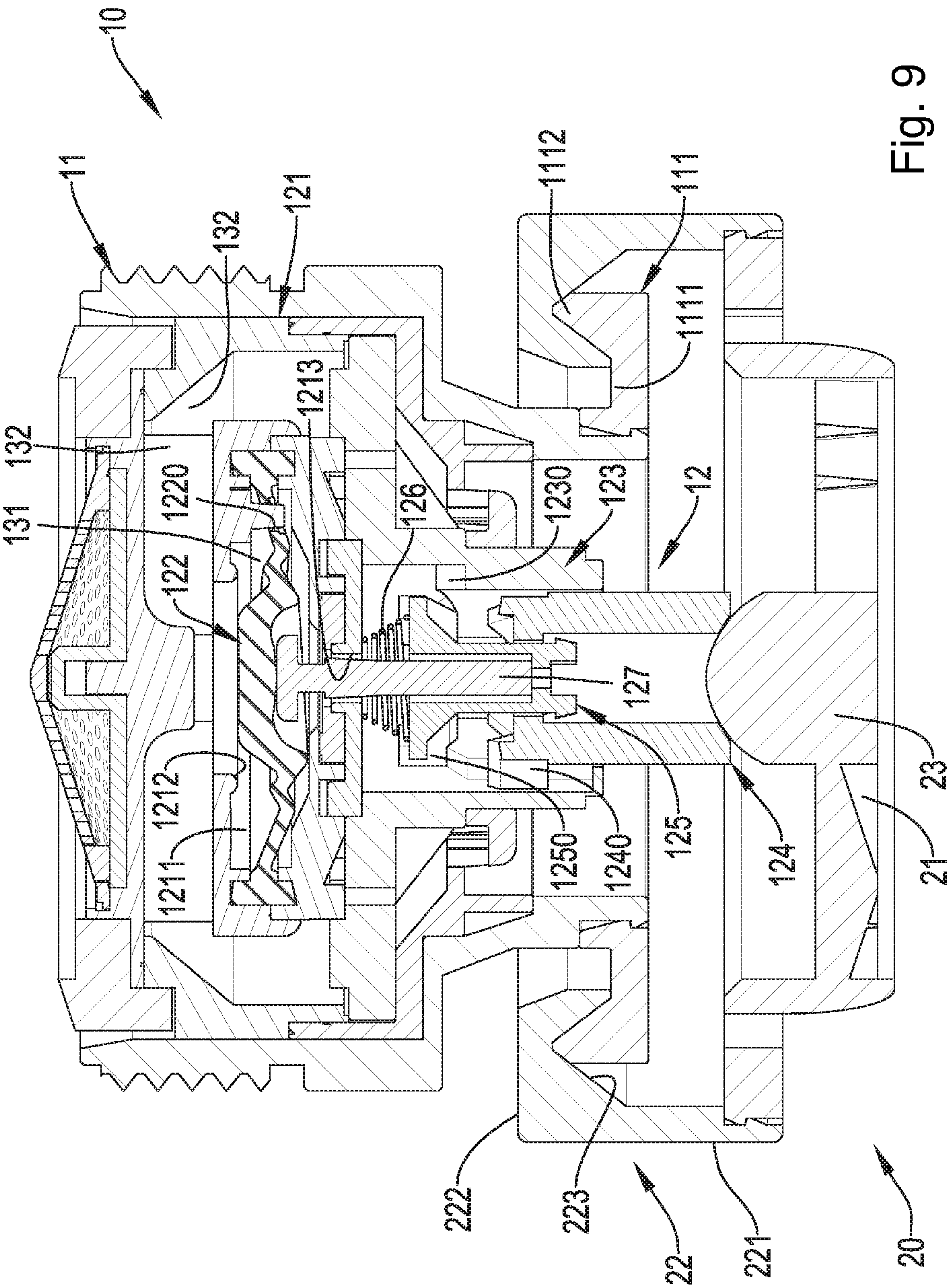
FIG. 9 is a cross-sectional view of the multi-directional touch valve of the present invention at an open state.
Figure 10:
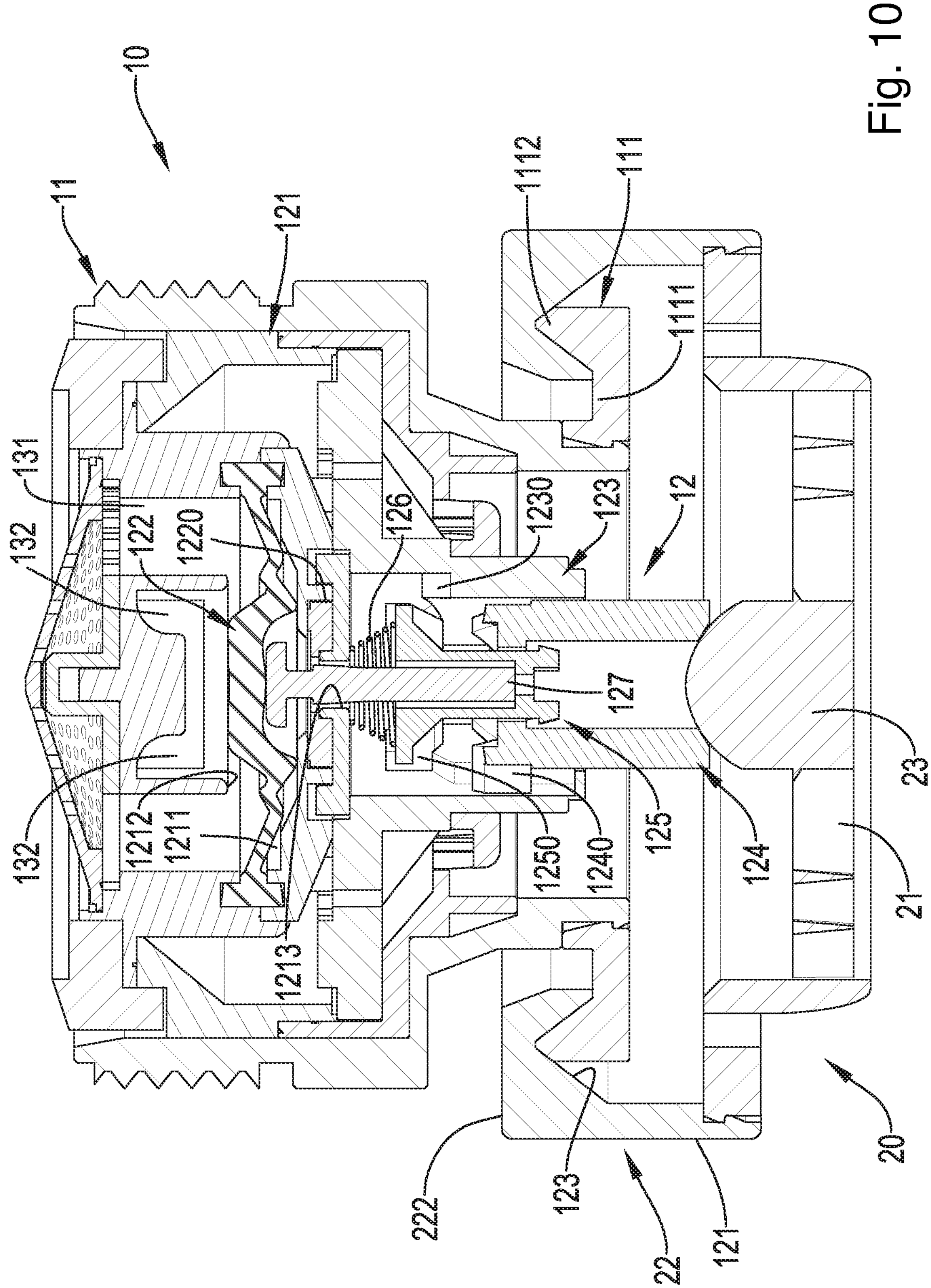
FIG. 10 is another cross-sectional view of the multi-directional touch valve of the present invention at the open state.

As shown in FIGS. 9 and 10, while in the transitional state, the state transitions to the open state at the moment when the rotation member 125 moves upwards. Upward movement of the rotation member 125 drives the blocking element 127 to move and unseal the first through hole 1213. Water in the auxiliary compartment can flow out from the first through hole 1213 to release pressure, causing the gasket 122 to move downwards or deform downwardly to unblock the opening 1212. The input path 131 of the primary flow channel is then connected with the output path 132 via the opening 1212, and water can flow to the output path 132 to provide a water supply.

When the pressing member 20 is pressed again by a user in any direction, the rotation member 125 rotates again, and the guided protrusions 1250 of the rotation member 125 are driven into the recess portions formed between the serrated portions 1230 of the control seat 123 and move away from the pipe connecting end. At the same time, the blocking element 127 can move downwards to seal the first through hole 1213 again. Water cannot flow out from the first through hole 1213 and instead accumulates in the auxiliary compartment. Water pressure then builds up to push the gasket 122 to seal the opening 1212, causing the multi-directional touch valve to return to the closed state.

As discussed above, a user can press the pressing member 20 in axial, transverse, and oblique directions to drive the switching mechanism 12 and cause the multi-directional touch valve to switch between the open state and the closed state, thereby render the touch valve convenient to use.

The invention claimed is:

1. A multi-directional touch valve comprising:
a valve body, including:
a housing having a water outlet end and a pipe connecting end opposite to each other, wherein an axial direction is defined as a direction along a line connecting the water outlet end and the pipe connecting end, and a transverse direction is defined as a direction perpendicular to the axial direction, the housing including:
at least one support portion formed at the water outlet end and protruding transversely outwardly,
a primary flow channel formed in the housing and extending from to the water outlet end to the pipe connecting end, and
a switching mechanism mounted in the housing and configured to selectively block the primary flow channel; and
a pressing member movably connected with the valve body, the pressing member including:
a push-abutment portion configured to selectively drive the switching mechanism to block the primary flow channel,
a water passage portion surrounding the push-abutment portion and configured to allow water to flow therethrough, and
at least one suspension portion fixed around an outer circumference of the water passage portion and movably hanging on the at least one support portion,
wherein a motion space is formed on an inner side of each of the at least one suspension portion and on a side of the suspension portion facing the pipe connecting end of the housing, and the pressing member is operable to move away from a center of the valve body and to move towards the pipe connecting end, such that the pressing member is moveable along axial, transverse, and oblique directions relative to a centerline of the valve body, and
wherein when the pressing member is moved relative to the valve body, the push-abutment portion drives the switching mechanism to block or unblock the primary flow channel.

2. The multi-directional touch valve of claim 1, wherein:
the support portion comprises:
a first transverse extension member protruding transversely outwardly from the water outlet end, and
a first axial extension member protruding from an outer edge of the first transverse extension member towards the pipe connecting end of the housing; and
each of the at least one suspension portion comprises:
a second axial extension member protruding from an outer edge of the water passage portion towards the pipe connecting end of the housing,
a second transverse extension member protruding transversely inwardly from an end portion of the second axial extension member adjacent to the pipe connecting end of the housing, and
a positioning groove formed on the second transverse extension member and including two opposite inclined surfaces facing each other, the first axial extension member movably positioned in the positioning groove.

3. The multi-directional touch valve of claim 2, wherein the positioning groove of each of the at least one suspension portion has the two opposite inclined surfaces facing each other.

4. The multi-directional touch valve of claim 3, wherein the first axial extension member of each of the at least one support portion has two opposite inclined surfaces facing away from each other and selectively abutting the two opposite inclined surfaces of the positioning groove.

5. The multi-directional touch valve of claim 2, wherein the second transverse extension member of each of the at least one suspension portion has a bevel formed on an inner edge of the second transverse extension member and inclined with respect to the axial direction.

6. The multi-directional touch valve of claim 5, wherein:
the housing has at least one groove formed thereon, and each of the at least one support portion forms a surface of the at least one groove respectively;
the motion space of each of the at least one suspension portion is located in the at least one groove; and
the at least one groove has a support surface, the support surface being parallel to the bevel of corresponding the suspension portion.

7. The multi-directional touch valve of claim 1, wherein:
a number of the at least one support portion is one, and the support portion is annular and protrudes radially; and
a number of the at least one suspension portion is one, and the suspension portion is annular and extends radially inwardly, and selectively abuts a side surface of the support portion facing the pipe connecting end of the housing.

8. The multi-directional touch valve of claim 2, wherein:
a number of the at least one support portion is one, and the first transverse extension member and the first axial extension member of the support portion are annular; and
a number of the at least one suspension portion is one, and the second axial extension member, the second transverse extension member, and the positioning groove of the suspension portion are annular.

* * * * *